(12) United States Patent
Zhang et al.

(10) Patent No.: US 12,478,038 B1
(45) Date of Patent: Nov. 25, 2025

(54) ROTATABLE FEEDING BOWL DEVICE AND PET FEEDER

(71) Applicant: Shenzhen Beibanqiu Network Technology Co, Ltd, Shenzhen (CN)

(72) Inventors: Xiangli Zhang, Shenzhen (CN); Wen Wan, Shenzhen (CN)

(*) Notice: Subject to any disclaimer, the term of this patent is extended or adjusted under 35 U.S.C. 154(b) by 0 days.

(21) Appl. No.: 19/030,154

(22) Filed: Jan. 17, 2025

(51) Int. Cl.
*A01K 5/02* (2006.01)

(52) U.S. Cl.
CPC .................................. *A01K 5/02* (2013.01)

(58) Field of Classification Search
CPC ....... A01K 5/02; A01K 5/0114; A01K 5/0142
See application file for complete search history.

(56) References Cited

U.S. PATENT DOCUMENTS

| | | | | |
|---|---|---|---|---|
| 2020/0253162 A1* | 8/2020 | Vachula | ............... | A01K 5/0291 |
| 2024/0081283 A1* | 3/2024 | Franklin | ............... | A01K 5/0208 |

FOREIGN PATENT DOCUMENTS

| | | | | | |
|---|---|---|---|---|---|
| CN | 118370227 | A | * | 7/2024 | |
| KR | 100822743 | B1 | * | 4/2008 | ............... A01K 7/02 |
| KR | 20160058547 | A | * | 5/2016 | ............... A01K 5/02 |
| KR | 20230058859 | A | * | 5/2023 | ............... A01K 7/02 |

* cited by examiner

*Primary Examiner* — Joshua D Huson
*Assistant Examiner* — Alanna K Peterson
(74) *Attorney, Agent, or Firm* — Daniel M. Cohn; Howard M. Cohn

(57) ABSTRACT

The present disclosure provides a rotatable feeding bowl device and pet feeder, comprising a base and a feeding bowl; wherein the base is disposed on the pet feeder; one end of the feeding bowl is rotatably connected to the base, so that the feeding bowl is enabled to be rotated on the pet feeder to a first preset position where a pet cannot eat, or to a second preset position where a pet can eat. It is only put down when a pet is eating and put away when a pet is not eating, which is conducive to keeping the feeding bowl clean and preventing a pet from polluting the feeding bowl when a pet is not eating, thereby ensuring the cleanliness of pet's feeding environment and avoiding affecting pet's health.

6 Claims, 8 Drawing Sheets

ROTATABLE FEEDING BOWL DEVICE AND PET FEEDER

TECHNICAL FIELD

The present disclosure relates to a technical field of pet feeding devices, and in particular to a rotatable feeding bowl device and pet feeder.

BACKGROUND

With the improvement of living standards, more and more users are willing to relieve the pressure of life and work by keeping pets. Pets are creatures that people keep for spiritual purposes. The pet industry is now an emerging and vibrant project, and the feeding of pets is of vital importance. Therefore, designing an automatic pet feeder that can autonomously feed pets has considerable economic and practical value.

However, research shows that the feeding bowls of conventional pet automatic feeders are mostly fixedly arranged at the bottom area of the feeder, so as to facilitate the pet to eat during the feeding time. However, the fixed feeding bowl cannot be put away, so the pelvic cavity of the feeding bowl is always in an area that can be touched by the pet, which may cause the pelvic cavity of the feeding bowl to be contaminated by the pet. For example, urinating or defecating in the feeding bowl or dropping shed hair into the feeding bowl affects the cleanliness of the pet's eating environment.

SUMMARY

In view of the above problems, the present disclosure provides a rotatable feeding bowl device that solves the problem of the feeding bowl of the existing pet feeding machine may be contaminated and pollute the pet's eating environment.

In order to realize the above purpose, the present disclosure provides the rotatable feeding bowl device, comprising a base and a feeding bowl; wherein the base is disposed on a pet feeder; one end of the feeding bowl is rotatably connected to the base, so that the feeding bowl is enabled to be rotated on the pet feeder to a first preset position where a pet cannot eat, or to a second preset position where a pet can eat.

In one optional embodiment, further comprising a driving mechanism, the driving mechanism is disposed on the base, and an output end of the driving mechanism is connected to one end of the feeding bowl to drive the feeding bowl to rotate between the first preset position where a pet cannot eat and the second preset position where a pet can eat.

In one optional embodiment, further comprising a controller, a signal transmitter and a signal receiver, the controller is electrically connected to the signal receiver and the driving mechanism, the signal transmitter is disposed on a pet, and the signal receiver is arranged adjacent to the feeding bowl; wherein the signal receiver is configured to receive a sensor signal transmitted by the signal transmitter within a preset range; the controller is configured to control the driving mechanism to drive the feeding bowl to rotate from the first preset position to the second preset position after receiving the sensor signal transmitted by the signal receiver, alternatively, the controller is configured to control the driving mechanism to drive the feeding bowl to rotate from the second preset position to the first preset position after failing to receive the sensor signal.

In one optional embodiment, the driving mechanism comprises a driving motor and a transmission assembly, wherein an output end of the driving motor is connected to the transmission assembly, the transmission assembly is connected to one end of the feeding bowl, the driving motor drives the transmission assembly to rotate, the transmission assembly drives the feeding bowl to rotate.

In one optional embodiment, the transmission assembly comprises a driving gear and a transmission gear, the driving gear is connected to an output end of the driving motor, and the transmission gear is meshed with the driving gear, a central axis of the transmission gear is provided with a connecting part, the connecting part is connected to one end of the feeding bowl.

In one optional embodiment, the driving mechanism further comprises a limiting assembly, which is disposed on the base and electrically connected to the driving motor, and the limiting assembly is configured to control the driving motor to stop working when the feeding bowl rotates to the first preset position or the second preset position.

In one optional embodiment, the limiting assembly comprises a first limiting member, a first triggering member, a second limiting member and a second triggering member; the first limiting member and the second limiting member are both disposed on the base and are electrically connected to the driving motor respectively; the first triggering member and the second triggering member are both disposed on the transmission assembly; when the transmission assembly rotates, the first triggering member and the second triggering member are driven to rotate; the first limiting member is disposed on a rotation path of the first triggering member, when the feeding bowl rotates to the first preset position, the first triggering member exactly triggers the first limiting member, and the first limiting member controls the driving motor to stop working; the second limiting member is disposed on a rotation path of the second triggering member, when the feeding bowl rotates to the second preset position, the second triggering member exactly triggers the second limiting member, and the second limiting member controls the driving motor to stop working.

In one optional embodiment, the first limiting member is provided with a first elastic switch, the second limiting member is provided with a second elastic switch, the first triggering member is provided with a first protrusion, and the second triggering member is provided with a second protrusion; the first elastic switch is disposed on a rotation path of the first protrusion, and the second elastic switch is disposed on a rotation path of the second protrusion; when the feeding bowl rotates to the first preset position, the first protrusion squeezes the first elastic switch, and then the first limiting member is triggered; when the feeding bowl rotates to the second preset position, the second protrusion squeezes the second elastic switch, and then the second limiting member is triggered.

In one optional embodiment, the feeding bowl comprises a basin-like structure and a rotating part, the rotating part is rotatably connected to the base, the rotating part is provided with an installation area matching with the basin-like structure, and the basin-like structure is detachably disposed on the installation area.

In order to solve the above problems, the present disclosure provides a pet feeder, further comprises a pet feeder body and the rotatable feeding bowl device as one of the above-mentioned.

The present disclosure has beneficial effects as follows:

The present disclosure provides the rotatable feeding bowl device, by rotating the feeding bowl on the base, when a pet needs to eat, the feeding bowl is rotated to the second preset position for a pet to eat, when a pet is full, rotate the feeding bowl to the first preset position where a pet cannot eat. It is only put down when a pet is eating and put away when a pet is not eating, which is conducive to keeping the feeding bowl clean and preventing a pet from polluting the feeding bowl when a pet is not eating, thereby ensuring the cleanliness of pet's feeding environment and avoiding affecting pet's health.

BRIEF DESCRIPTION OF DRAWINGS

To more clearly illustrate technical solutions in embodiments of the present disclosure, drawings required in the description or prior art are briefly introduced below, and obviously, the drawings in the following description are merely some embodiments of the present disclosure. For a person having ordinary skill in art, other drawings may be obtained according to the drawings without creative efforts.

Figure 1:
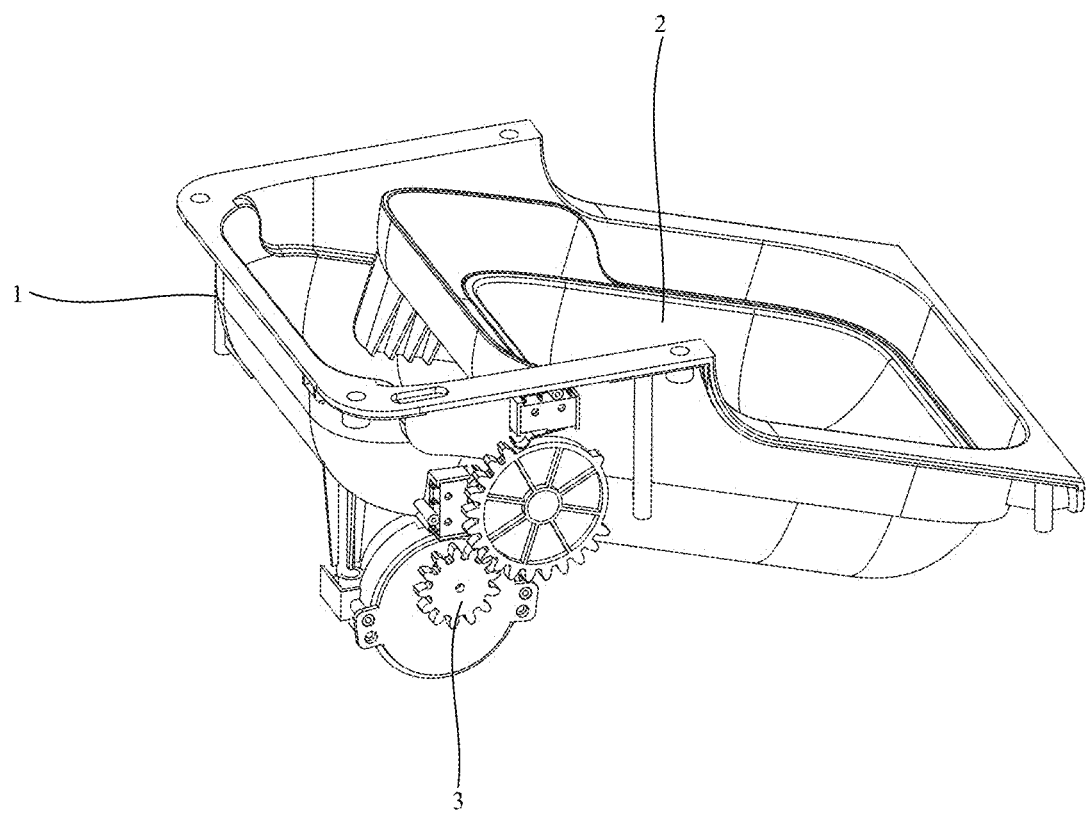
FIG. 1 is a perspective schematic diagram of a rotatable feeding bowl device according to one embodiment of the present disclosure.

Reference numbers in the drawings: 1—base; 2—feeding bowl; 3—driving mechanism; 4—controller; 5—signal transmitter; 6—signal receiver; 21—insertion hole; 211—limiting protrusion; 22—basin-like structure; 23—rotating part; 31—driving motor; 32—transmission assembly; 33—limiting assembly; 100—pet feeder body; 200—rotatable feeding bowl device; 321—driving gear; 322—transmission gear; 323—connecting part; 33—limiting assembly; 331—first limiting member; 332—first triggering member; 333—second limiting member; 334—second triggering member; 3311—first elastic switch; 3321—first protrusion; 3331—second elastic switch; 3341—second protrusion.

DETAILED DESCRIPTION

The following describes embodiments of the technical solutions of the present disclosure in detail about the accompanying drawings. The following embodiments are merely used to clearly describe the technical solutions of the present disclosure and do not intend to limit the protection scope of the present disclosure.

Unless otherwise defined, all technical and scientific terms used herein have the same meaning as commonly understood by those skilled in the art to which the present disclosure belongs. The terminology used herein is to describe particular embodiments only and is not intended to limit the present disclosure; the terms "comprise", "comprise", and any variations thereof in the specification and claims of the present disclosure and the above drawings are intended to cover a non-exclusive inclusion.

In the description of the embodiments of the present disclosure, the technical terms "first", "second", and the like are merely used to distinguish different objects, and cannot be understood as indicating or implying relative importance or implicitly indicating a quantity, a specific order, or a primary and secondary relationship of the indicated technical features.

Reference herein to "embodiment" means that a particular feature, structure, or characteristic described in connection with one embodiment or one implement may be comprised in at least one embodiment of the present disclosure. The appearances of the "embodiment" in various positions in the specification do not necessarily refer to the same embodiment and are not independent or alternative embodiments mutually exclusive of other embodiments. Those skilled in the art explicitly and implicitly understand that the embodiments described herein may be combined with other embodiments.

In addition, it should be noted in the description of the present disclosure that, unless otherwise regulated and defined, terms such as "installation," and "connection" shall be understood in a broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

Figure 2:
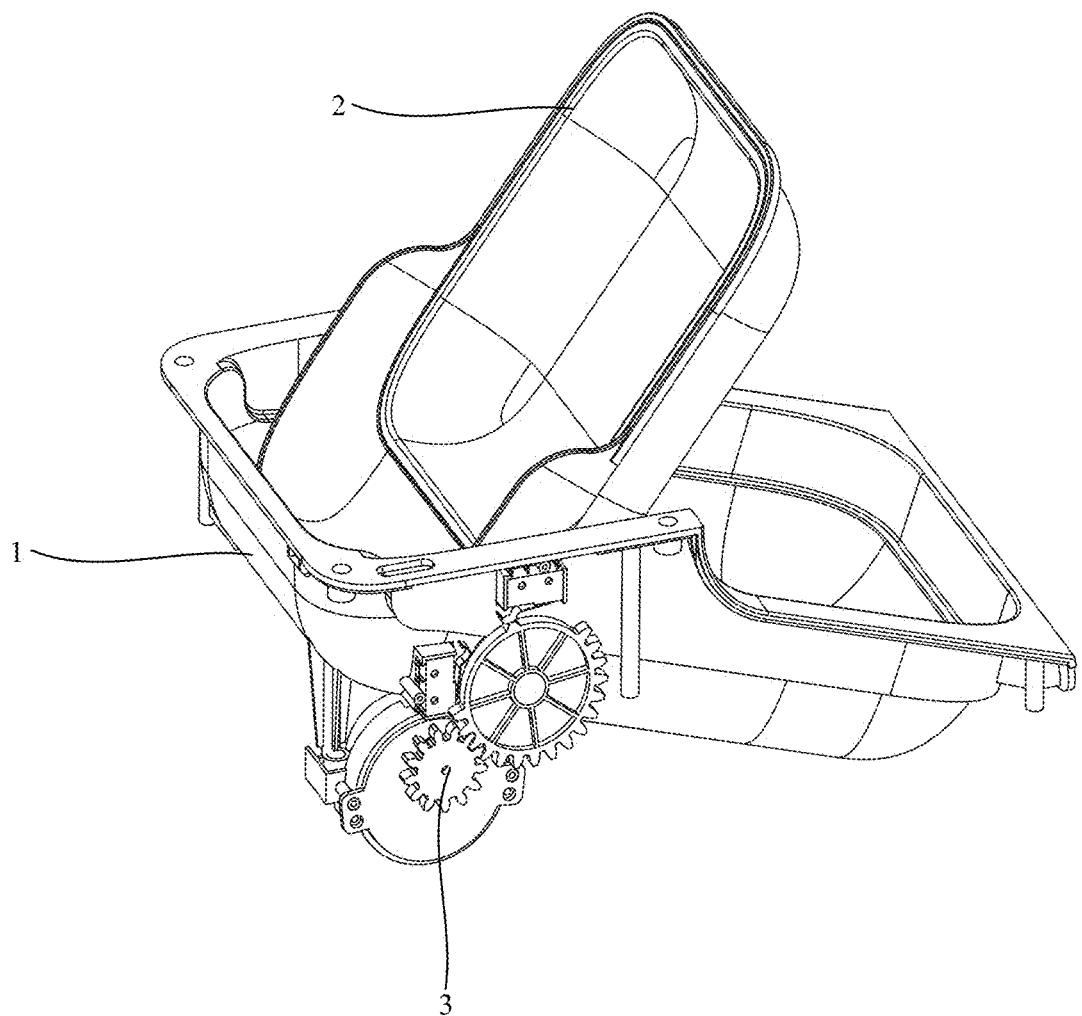
FIG. 2 is a perspective schematic diagram of a feeding bowl when the feeding bowl is in a second preset position according to one embodiment of the present disclosure.

FIG. 1 is a perspective schematic diagram of a rotatable feeding bowl device according to one embodiment of the present disclosure. As shown in FIG. 1, the present disclosure provides the rotatable feeding bowl device that comprises a base 1 and a feeding bowl 2.

Wherein the base 1 is disposed on the pet feeder; and the base 1 and the pet feeder are fixedly disposed. One end of the feeding bowl 2 is rotatably connected to the base 1, so that the feeding bowl 2 is enabled to be rotated on the pet feeder to a first preset position where a pet cannot eat (as shown in FIG. 2), or to a second preset position where a pet can eat (as shown in FIG. 1).

Specifically, the rotational connection between the feeding bowl 2 and the base 1 is enable to be achieved through a rotating shaft. That is, by providing a mounting hole on the base 1, rotatably setting the rotating shaft in the mounting hole, and connecting the rotating shaft to the feeding bowl 2, the rotational connection between the feeding bowl 2 and the base 1 is enable to be achieved. It should be noted that the feeding bowl 2 needs to rotate between the first preset position and the second preset position. Therefore, when the rotatable feeding bowl is installed on the pet feeder, a corresponding space needs to be reserved on the pet feeder for the feeding bowl 2 to rotate. Furthermore, in order to better keep the feeding bowl 2 clean, when the feeding bowl 2 is rotated to the first preset position, the bowl opening can fit into the housing area of the pet feeder to prevent debris from falling into the feeding bowl 2. Therefore, in this embodiment, the setting of the first preset position should also be set in combination with the housing structure of the pet feeder.

In this embodiment, the first preset position and the second preset position are preset. For example, the first preset position may be a high position, that is, by rotating the feeding bowl 2, one end of the feeding bowl 2 is significantly raised, so that a pet cannot touch the pelvic area of the feeding bowl 2. When the rotatable feeding bowl device is installed on the pet feeder, the feeding bowl 2 can be rotated to raise one end so that the bowl opening area of the feeding bowl 2 is close to the side wall of the pet feeder or other areas, so that a pet cannot touch the pelvic area of the feeding bowl 2. The second preset position is an area convenient for a pet to eat, for example, the feeding bowl 2 is placed flat on the ground so that a pet can eat by lowering its head.

In this embodiment, the feeding bowl 2 is rotatably disposed on the base 1. When a pet needs to eat, the feeding bowl 2 is rotated to the second preset position for a pet to eat, when a pet is full, rotate the feeding bowl 2 to the first preset position where a pet cannot eat. It is only put down when a pet is eating and put away when a pet is not eating, which is conducive to keeping the feeding bowl 2 clean and preventing a pet from polluting the feeding bowl 2 when a pet is not eating, thereby ensuring the cleanliness of pet's feeding environment and avoiding affecting pet's health.

Figure 3:
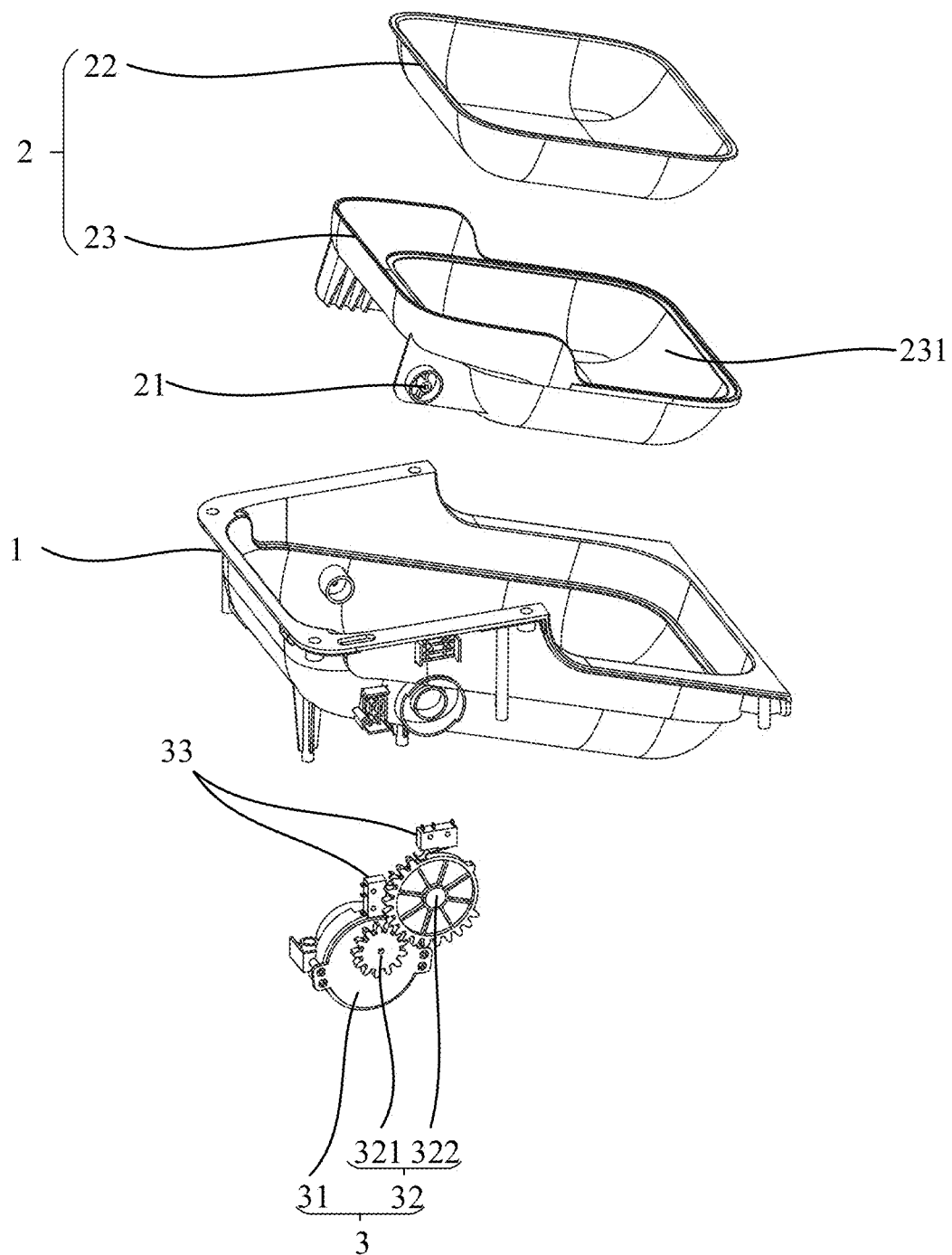
FIG. 3 is a perspective schematic diagram of the exploded structure of the rotatable feeding bowl device according to one embodiment of the present disclosure.

Furthermore, in order to reduce the manual operation of users, based on the above embodiments, in other embodiments, as shown in FIGS. 1, 2 and 3, the rotatable feeding bowl device further comprises a driving mechanism 3, the driving mechanism 3 is disposed on the base 1, and an output end of the driving mechanism 3 is connected to one end of the feeding bowl 2 to drive the feeding bowl 2 to rotate between the first preset position where a pet cannot eat and the second preset position where a pet can eat.

Specifically, by providing the driving mechanism 3, the driving mechanism 3 is configured to drive the feeding bowl 2 to rotate, thereby, there is no need for the user to manually rotate the feeding bowl 2. The driving mechanism 3 is enable to be controlled by setting a switch. When the user turns on the switch, the driving mechanism 3 starts to work and drives the feeding bowl 2 to rotate. When the user turns off the switch, the driving mechanism 3 stops working.

Figure 4:
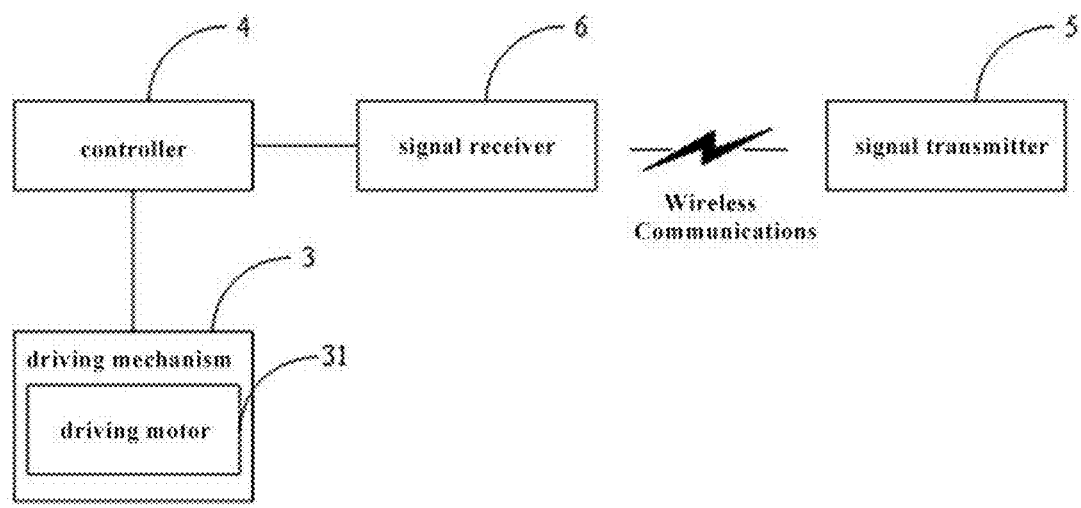
FIG. 4 is a perspective schematic diagram of the electrical connection relationship of the rotatable feeding bowl device according to one embodiment of the present disclosure.

Furthermore, in order to improve the automation level of the rotatable feeding bowl device, based on the above embodiments, in other embodiments, as shown in FIG. 4, the rotatable feeding bowl device further comprises a controller 4, a signal transmitter 5 and a signal receiver 6, the controller 4 is electrically connected to the signal receiver 6 and the driving mechanism 3, the signal transmitter 5 is disposed on a pet, and the signal receiver 6 is arranged adjacent to the feeding bowl 2; wherein the signal receiver 6 is configured to receive a sensor signal transmitted by the signal transmitter 5 within a preset range; the controller 4 is configured to control the driving mechanism 3 to drive the feeding bowl 2 to rotate from the first preset position to the second preset position after receiving the sensor signal transmitted by the signal receiver 6, alternatively, the controller 4 is configured to control the driving mechanism 3 to drive the feeding bowl 2 to rotate from the second preset position to the first preset position after failing to receive the sensor signal.

Wherein, the signal transmitter 5 and the signal receiver 6 are preferably implemented using RFID (Radio Frequency Identification) technology. A RFID tag is used as the signal transmitter 5, and the signal transmitter 5 is installed in the neck area of a pet; a RFID induction coil is used as the signal receiver 6 to receive the radio frequency signal sent by the RFID tag. It should be noted that, in this embodiment, the power of the signal transmitter 5 and the signal receiver 6 needs to be set to limit the range in which the signal receiver 6 can sense the sensing signal. If the signal exceeds the range, the signal receiver 6 will not be able to receive it. Therefore, only when the signal transmitter 5 is close to the preset range of the signal receiver 6, the signal receiver 6 can receive the signal transmitted by the signal transmitter 5, thereby preventing accidental touch. Preferably, when a pet needs to eat, the pet's neck area will approach the feeding bowl 2. The signal receiver 6 is disposed adjacent to the feeding bowl 2, and the signal transmitter 5 is disposed at the neck area of a pet, so that a pet can receive the signal transmitted by the signal transmitter 5 when a pet approaches the feeding bowl 2.

Specifically, in the initial state, the feeding bowl 2 is in a first preset position where a pet cannot eat. After a pet approaches the feeding bowl 2, when the signal receiver 6 senses the sensing signal transmitted by the signal transmitter 5, the controller 4 controls the driving mechanism 3 to work, and the driving mechanism 3 drives the feeding bowl 2 to rotate from the first preset position to the second preset position where a pet can eat; when a pet is full and moves away from the feeding bowl 2, and the signal receiver 6 cannot sense the sensing signal, the controller 4 controls the driving mechanism 3 to drive the feeding bowl 2 to rotate from the second preset position to the first preset position.

This embodiment provides the controller 4, the signal transmitter 5 and the signal receiver 6 to automatically control the opening and closing states of the feeding bowl 2 according to whether a pet is close to the feeding bowl 2, so that the rotatable feeding bowl device is more automated, further reducing the manual operations that the user needs to perform and improving the user experience.

Furthermore, as shown in FIG. 3, the driving mechanism 3 comprises a driving motor 31 and a transmission assembly 32, wherein an output end of the driving motor 31 is connected to the transmission assembly 32, the transmission assembly 32 is connected to one end of the feeding bowl 2, the driving motor 2 drives the transmission assembly 32 to rotate, the transmission assembly 32 drives the feeding bowl 2 to rotate.

Specifically, the driving mechanism 3 comprising the driving motor 31 and the transmission assembly 32. The transmission assembly 32 is driven by the driving motor 31, and the transmission assembly 32 drives the feeding bowl 2 to rotate.

Furthermore, as shown in FIG. 3, the transmission assembly 32 comprises a driving gear 321 and a transmission gear 322, the driving gear 321 is connected to an output end of the driving motor 31, and the transmission gear 322 is meshed with the driving gear 321, a central axis of the transmission gear 322 is provided with a connecting part 323, the connecting part 323 is connected to one end of the feeding bowl 2.

Figure 5:
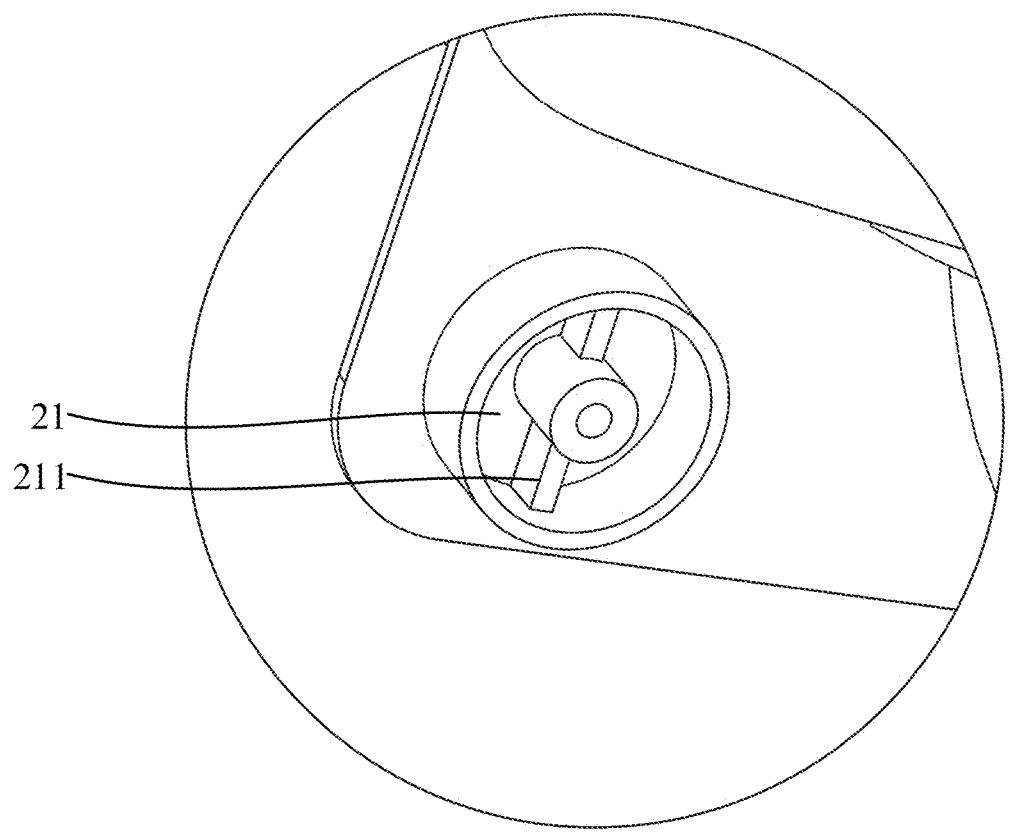
FIG. 5 is a partial enlarged schematic diagram of the feeding bowl according to one embodiment of the present disclosure.
Figure 6:
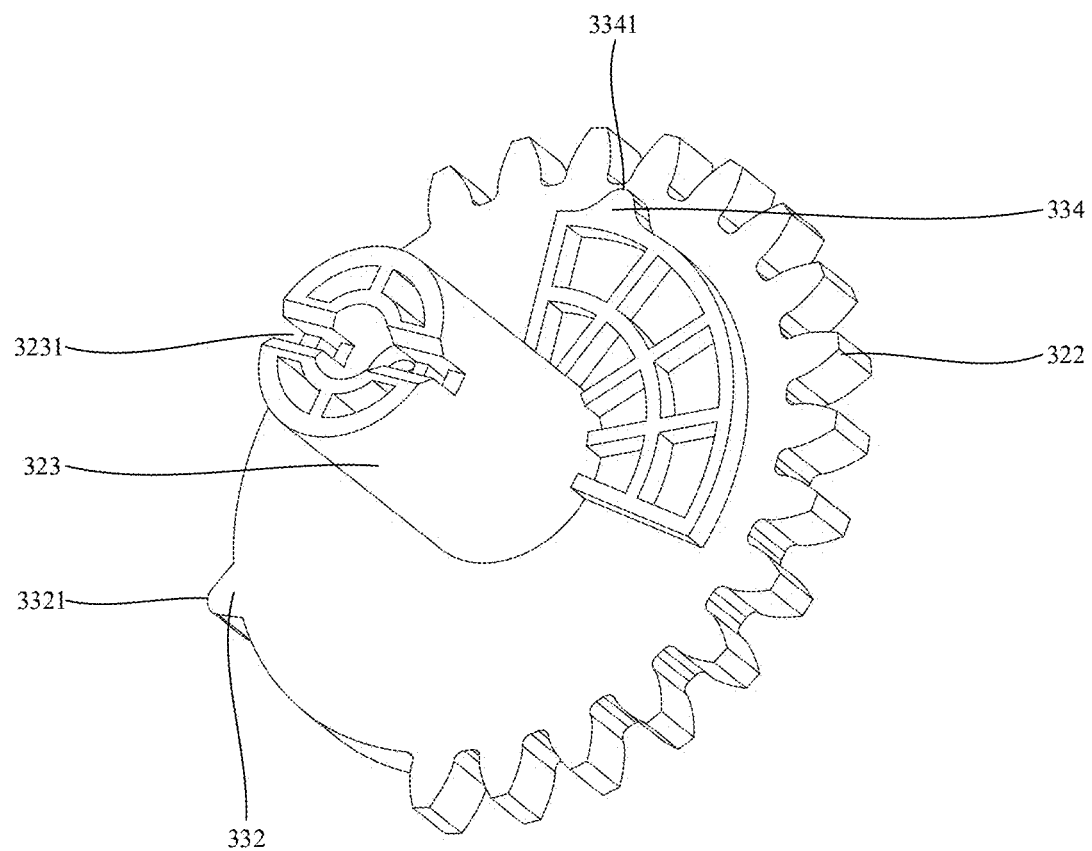
FIG. 6 is a perspective schematic diagram of a transmission gear according to one embodiment of the present disclosure.
Figure 7:
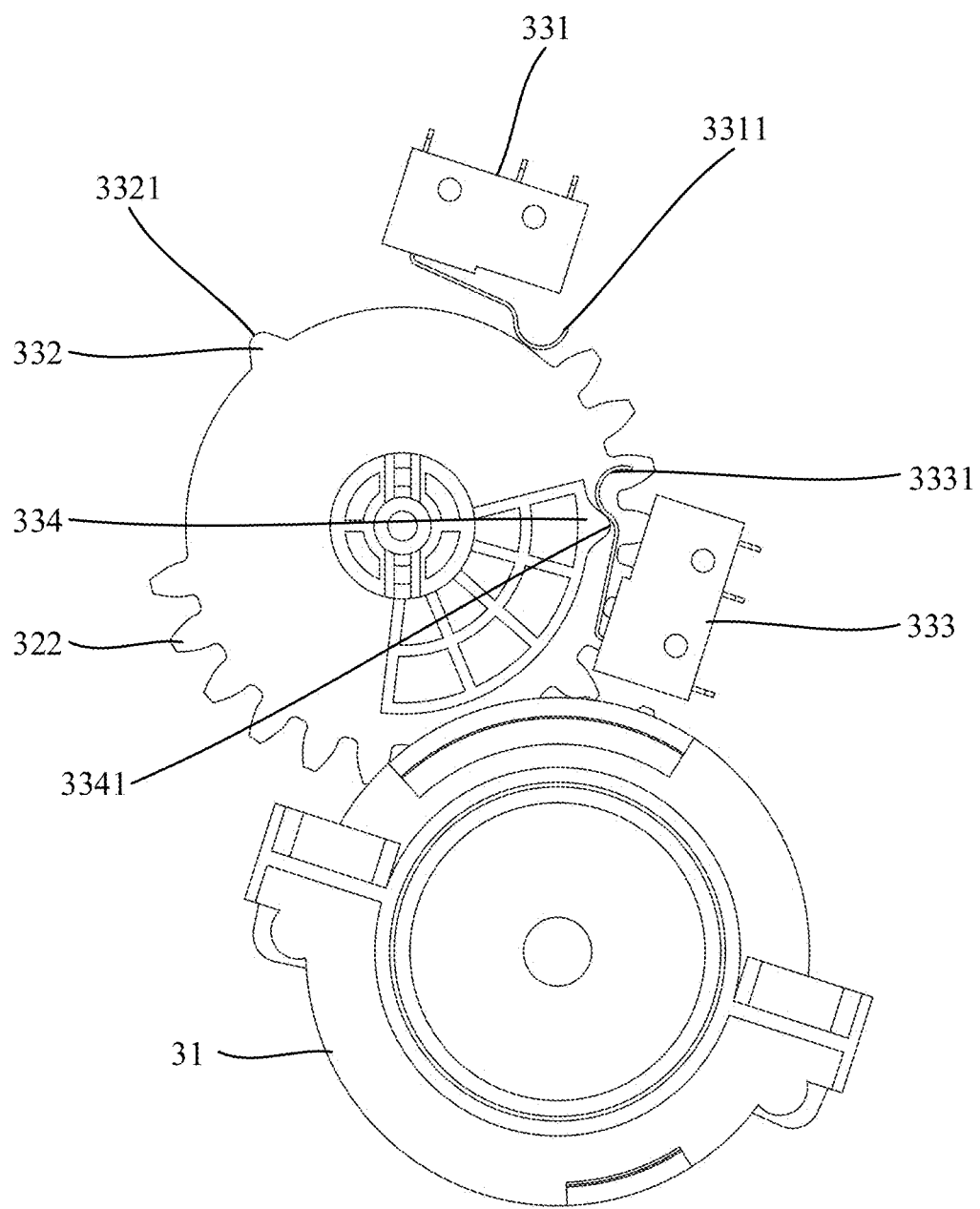
FIG. 7 is a perspective schematic diagram of a driving mechanism according to one embodiment of the present disclosure.

Specifically, as shown in FIGS. 2 and 5, an insertion hole 21 is disposed on one end of the feeding bowl 2, and a limiting protrusion 211 is disposed in the insertion hole 21. A limiting groove 3231 matching the limiting protrusion 211 is disposed on the connecting part 323 (please refer to FIG. 6). When the connecting part 323 is inserted into the insertion hole 21, the limiting protrusion 211 is engaged with the limiting groove 3231. When the transmission gear 322 rotates, the connection part 323 applies a force to the feeding bowl 2 through the limiting protrusion 211 and the limiting groove 3231, so that the feeding bowl 2 rotates.

Furthermore, in order to further improve the intelligence level of the rotatable feeding bowl device, excessive rotation is prevented from occurring during the rotation of the feeding bowl 2. Based on the above embodiments, in other embodiments, as shown in FIG. 3, the driving mechanism 3 further comprises a limiting assembly 33, which is disposed on the base 1 and electrically connected to the driving motor 31, and the limiting assembly 33 is configured to control the driving motor 31 to stop working when the feeding bowl 2 rotates to the first preset position or the second preset position.

Specifically, by setting the limiting assembly 33, the limiting assembly 33 is configured to limiting the working state of the driving motor 31. When the driving motor 31 starts working to drive the feeding bowl 2 to rotate, the limiting assembly 33 is triggered when the feeding bowl 2 rotates to the first preset position or the second preset position. The limiting assembly 33 immediately controls the driving motor 31 to stop working, so that the feeding bowl 2 is exactly in the first preset position or the second preset position, thereby eliminating the need for manual control of the driving motor 31.

Furthermore, the limiting assembly 33 comprises a first limiting member 331, a first triggering member 332, a second limiting member 333 and a second triggering member 334; the first limiting member 331 and the second limiting member 332 are both disposed on the base 1 and are electrically connected to the driving motor 31 respectively; the first triggering member 332 and the second triggering member 334 are both disposed on the transmission assembly 32; when the transmission assembly 32 rotates, the first triggering member 332 and the second triggering member 334 are driven to rotate.

Wherein, the first limiting member 331 is disposed on a rotation path of the first triggering member 332, when the feeding bowl 2 rotates to the first preset position, the first triggering member 332 exactly triggers the first limiting member 331, and the first limiting member 331 controls the driving motor 31 to stop working.

Wherein, the second limiting member 333 is disposed on the rotation path of the second triggering member 334, when the feeding bowl 2 rotates to the second preset position, the second triggering member 334 exactly triggers the second limiting member 333, and the second limiting member 333 controls the driving motor 31 to stop working.

Specifically, the positions of the first limiting member 331, the first triggering member 332, the second limiting member 333, and the second triggering member 334 must be preset so that the first limiting member 331 is on the rotation path of the first triggering member 332 and the second limiting member 333 is on a rotation path of the second triggering member 334. Furthermore, when the feeding bowl 2 rotates to the first preset position, the first triggering member 332 exactly triggers the first limiting member 331, and when the feeding bowl 2 rotates to the second preset position, the second triggering member 334 exactly triggers the second limiting member 333, thereby precisely controlling the working state of the driving motor 31 and ensuring that the feeding bowl 2 can exactly stay at the first preset position or the second preset position.

Furthermore, the first limiting member 331 is provided with a first elastic switch 3311, the second limiting member 333 is provided with a second elastic switch 3331, the first triggering member 332 is provided with a first protrusion 3321, and the second triggering member 334 is provided with a second protrusion 3341; the first elastic switch 3311 is disposed on a rotation path of the first protrusion 3321, and the second elastic switch 3331 is disposed on a rotation path of the second protrusion 3341; when the feeding bowl 2 rotates to the first preset position, the first protrusion 3321 squeezes the first elastic switch, and then the first limiting member 331 is triggered; when the feeding bowl 2 rotates to the second preset position, the second protrusion 3341 squeezes the second elastic switch 3331, and then the second limiting member 333 is triggered.

It should be noted that when the elastic switch is squeezed, it will deform, so that the internal circuit is connected. After the squeezing stops, the elastic switch returns to its original state due to its own elasticity, and its internal circuit is disconnected. In this embodiment, when the driving motor 31 starts to work, the first protrusion 3321 or the second protrusion 3341 starts to rotate. During the rotation process, when the first protrusion 3321 touches the first elastic switch 3311, it will squeeze the first elastic switch 3311, causing the first elastic switch 3311 to be turned on, and then the first limiting member 331 senses the electrical signal and is triggered, so the first limiting member 331 controls driving motor 31 will stop working. When the first protrusion 3321 does not touch the first elastic switch 3311, the first elastic switch 3311 is always in an off state, and the first limiting member 331 will not be triggered. When the second protrusion 3341 touches the second elastic switch 3331, it will squeeze the second elastic switch 3331, causing the second elastic switch 3331 to be turned on, and then the second limiting member 332 senses the electrical signal and is triggered, so the second limiting member 332 controls driving motor 31 will stop working. When the second protrusion 3341 does not touch the second elastic switch 3331, the second elastic switch 3331 is always in an off state, and the second limiting member 333 will not be triggered.

Furthermore, in order to facilitate the cleaning of the feeding bowl, the pelvic cavity of the feeding bowl is kept clean. Based on the above embodiments, in other embodiments, as shown in FIG. 3, the feeding bowl 2 comprises a basin-like structure 22 and a rotating part 23, the rotating part 23 is rotatably connected to the base 1, the rotating part 23 is provided with an installation area matching with the basin-like structure 22, and the basin-like structure 22 is detachably disposed on the installation area.

Specifically, the basin-like structure 22 is detachably mounted on the rotating part 23, so that the basin-like structure 22 can be removed from the rotating part 23, which facilitates the cleaning of the basin-like structure 22, thereby ensuring a high degree of cleanliness of pet's eating environment.

Figure 8:
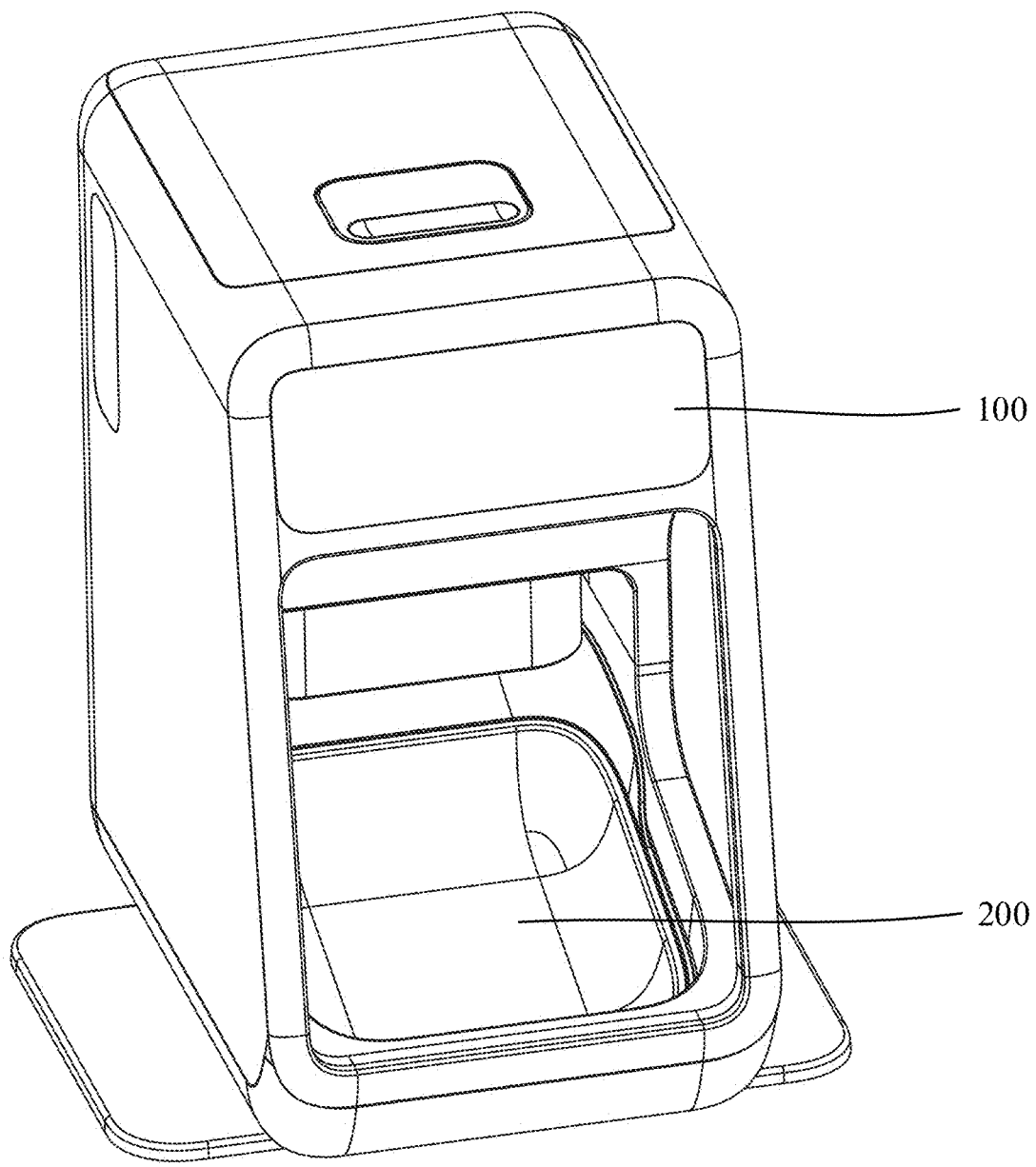
FIG. 8 is a perspective schematic diagram of a pet feeder according to one embodiment of the present disclosure.

FIG. 8 is a perspective schematic diagram of a pet feeder according to one embodiment of the present disclosure. As shown in FIG. 8, the pet feeder comprises a pet feeder body 100 and the rotatable feeding bowl device 200 according to one of the above embodiments.

The above-mentioned embodiments are only used to illustrate technical solutions of the present disclosure, but not to limit the present disclosure. Although the present disclosure has been described in detail about the foregoing embodiments. It should be understood that those of ordinary skill in the art are still able to modify the technical solutions described in the foregoing embodiments, or equivalently replace some of the technical features in the foregoing embodiments, and these modifications or replacements do not make the essence of the corresponding technical solutions deviate from spirit and scope of the technical solutions of the embodiment of the present disclosure. In particular, as long as there is no structural conflict, the various technical features mentioned in each of the embodiments can be combined in any way. The present disclosure is not limited to the specific embodiments disclosed herein but comprises all technical solutions falling within the scope of the claims.

What is claimed is:

1. A rotatable feeding bowl device, comprising a base, a driving mechanism, and a feeding bowl;
   wherein the base is disposed on a pet feeder body; one end of the feeding bowl is rotatably connected to the base, so that the feeding bowl is enabled to be rotated on the pet feeder body to an inclined first preset position where a pet cannot eat, or to a second preset position where a pet can eat,
   wherein the feeding bowl comprises a basin-like structure and a rotating part, the rotating part is rotatably connected to the base, the rotating part is provided with a concave installation area matching with the basin-like structure, and the basin-like structure is detachably disposed in the concave installation area;
   wherein the driving mechanism is disposed on the base, and an output end of the driving mechanism is connected to one end of the feeding bowl to drive the feeding bowl to rotate between the first preset position where a pet cannot eat and the second preset position where a pet can eat;
   wherein the driving mechanism comprises a driving motor and a transmission assembly, wherein an output end of the driving motor is connected to the transmission assembly, the transmission assembly is connected to one end of the feeding bowl, the driving motor drives the transmission assembly to rotate, the transmission assembly drives the feeding bowl to rotate;
   wherein the driving mechanism further comprises a limiting assembly, which is disposed on the base and electrically connected to the driving motor, and the limiting assembly is configured to control the driving motor to stop working when the feeding bowl rotates to the first preset position or the second preset position;
   wherein the limiting assembly comprises a first limiting member, a first triggering member, a second limiting member and a second triggering member; the first limiting member and the second limiting member are both disposed on the base and are electrically connected to the driving motor respectively; the first triggering member and the second triggering member are both disposed on the transmission assembly; when the transmission assembly rotates, the first triggering member and the second triggering member are driven to rotate;
   the first limiting member is disposed on a rotation path of the first triggering member, when the feeding bowl rotates to the first preset position, the first triggering member exactly triggers the first limiting member, and the first limiting member controls the driving motor to stop working;
   the second limiting member is disposed on a rotation path of the second triggering member, when the feeding bowl rotates to the second preset position, the second triggering member exactly triggers the second limiting member, and the second limiting member controls the driving motor to stop working;
   wherein the first limiting member is provided with a first elastic switch, the second limiting member is provided with a second elastic switch, the first triggering member is provided with a first protrusion configured to squeeze the first elastic switch at the first preset position and configured to trigger the first limiting member, and the second triggering member is provided with a second protrusion configured to squeeze the second elastic switch at the second preset position and configured to trigger the second limiting member; the first elastic switch is disposed on a rotation path of the first protrusion, and the second elastic switch is disposed on a rotation path of the second protrusion.

2. The rotatable feeding bowl device according to claim 1, further comprising a controller, a signal transmitter and a signal receiver, the controller is electrically connected to the signal receiver and the driving mechanism, the signal transmitter is capable of being disposed on the pet, and the signal receiver is arranged adjacent to the feeding bowl;
   wherein the signal receiver is configured to receive a sensor signal transmitted by the signal transmitter within a preset range;
   the controller is configured to control the driving mechanism to drive the feeding bowl to rotate from the first preset position to the second preset position after receiving the sensor signal transmitted by the signal receiver, alternatively, the controller is configured to control the driving mechanism to drive the feeding bowl to rotate from the second preset position to the first preset position after failing to receive the sensor signal.

3. The rotatable feeding bowl device according to claim 1, wherein the transmission assembly comprises a driving gear and a transmission gear meshed with the driving gear, the driving gear is connected to the output end of the driving motor, a central axis of the transmission gear is provided with a connecting part, the connecting part is connected to one end of the feeding bowl.

4. A pet feeder, comprising a pet feeder body, a base, a driving mechanism, and a feeding bowl;
   wherein the base is disposed on the pet feeder body; one end of the feeding bowl is rotatably connected to the base, so that the feeding bowl is enabled to be rotated on the pet feeder body to an inclined first preset position where a pet cannot eat, or to a second preset position where a pet can eat,
   wherein the feeding bowl comprises a basin-like structure and a rotating part, the rotating part is rotatably connected to the base, the rotating part is provided with a concave installation area matching with the basin-like structure, and the basin-like structure is detachably disposed in the concave installation area;
   wherein the driving mechanism is disposed on the base, and an output end of the driving mechanism is connected to one end of the feeding bowl to drive the feeding bowl to rotate between the first preset position where a pet cannot eat and the second preset position where a pet can eat;
   wherein the driving mechanism comprises a driving motor and a transmission assembly, wherein an output end of the driving motor is connected to the transmission assembly, the transmission assembly is connected to one end of the feeding bowl, the driving motor drives the transmission assembly to rotate, the transmission assembly drives the feeding bowl to rotate:
   wherein the driving mechanism further comprises a limiting assembly, which is disposed on the base and electrically connected to the driving motor, and the limiting assembly is configured to control the driving motor to stop working when the feeding bowl rotates to the first preset position or the second preset position;
   wherein the limiting assembly comprises a first limiting member, a first triggering member, a second limiting member and a second triggering member; the first limiting member and the second limiting member are both disposed on the base and are electrically connected to the driving motor respectively; the first triggering member and the second triggering member are both disposed on the transmission assembly; when the transmission assembly rotates, the first triggering member and the second triggering member are driven to rotate;

wherein the first limiting member is disposed on a rotation path of the first triggering member, when the feeding bowl rotates to the first preset position, the first triggering member exactly triggers the first limiting member, and the first limiting member controls the driving motor to stop working;

wherein the second limiting member is disposed on a rotation path of the second triggering member, when the feeding bowl rotates to the second preset position, the second triggering member exactly triggers the second limiting member, and the second limiting member controls the driving motor to stop working;

wherein the first limiting member is provided with a first elastic switch, the second limiting member is provided with a second elastic switch, the first triggering member is provided with a first protrusion configured to squeeze the first elastic switch at the first preset position and configured to trigger the first limiting member, and the second triggering member is provided with a second protrusion configured to squeeze the second elastic switch at the second preset position and configured to trigger the second limiting member; the first elastic switch is disposed on a rotation path of the first protrusion, and the second elastic switch is disposed on a rotation path of the second protrusion.

5. The pet feeder according to claim 4, further comprising a controller, a signal transmitter and a signal receiver, the controller is electrically connected to the signal receiver and the driving mechanism, the signal transmitter is capable of being disposed on the pet, and the signal receiver is arranged adjacent to the feeding bowl;

wherein the signal receiver is configured to receive a sensor signal transmitted by the signal transmitter within a preset range;

the controller is configured to control the driving mechanism to drive the feeding bowl to rotate from the first preset position to the second preset position after receiving the sensor signal transmitted by the signal receiver, alternatively, the controller is configured to control the driving mechanism to drive the feeding bowl to rotate from the second preset position to the first preset position after failing to receive the sensor signal.

6. The pet feeder according to claim 4, wherein the transmission assembly comprises a driving gear and a transmission gear meshed with the driving gear, the driving gear is connected to the output end of the driving motor, a central axis of the transmission gear is provided with a connecting part, the connecting part is connected to one end of the feeding bowl.

* * * * *